(12) United States Patent
Pandey et al.

(10) Patent No.: US 12,417,570 B2
(45) Date of Patent: Sep. 16, 2025

(54) VECTORIZING BY PIECEWISE DECONSTRUCTION OF OBJECT STROKES

(71) Applicant: Adobe Inc., San Jose, CA (US)

(72) Inventors: Kush Pandey, Aligarh (IN); Tarun Beri, Noida (IN); Gini Angurala, Mohali (IN)

(73) Assignee: Adobe Inc., San Jose, CA (US)

( * ) Notice: Subject to any disclaimer, the term of this patent is extended or adjusted under 35 U.S.C. 154(b) by 242 days.

(21) Appl. No.: 18/196,787

(22) Filed: May 12, 2023

(65) Prior Publication Data

US 2024/0378775 A1  Nov. 14, 2024

(51) Int. Cl.
| | |
|---|---|
| G06T 11/40 | (2006.01) |
| G06T 7/13 | (2017.01) |
| G06T 7/60 | (2017.01) |
| G06T 7/90 | (2017.01) |
| G06T 11/00 | (2006.01) |
| G06T 11/60 | (2006.01) |

(52) U.S. Cl.
CPC .......... *G06T 11/40* (2013.01); *G06T 7/13* (2017.01); *G06T 7/60* (2013.01); *G06T 7/90* (2017.01); *G06T 11/001* (2013.01); *G06T 11/60* (2013.01); *G06T 2200/24* (2013.01); *G06T 2207/10024* (2013.01); *G06T 2207/20084* (2013.01)

(58) Field of Classification Search
None
See application file for complete search history.

(56) References Cited

U.S. PATENT DOCUMENTS

2021/0248753 A1\* 8/2021 Kaneko ............... G06T 7/13

FOREIGN PATENT DOCUMENTS

WO WO-2022247628 A1 \* 12/2022

OTHER PUBLICATIONS

Jin et al., a machine-translated English version of a foreign patent application (WO 2022247628 A1) (Year: 2021).\*
Li et al., Lane Marking Detection and Reconstruction with Line-Scan Imaging, Data Sensors 2018, 18, 1635; doi:10.3390/s18051635 (Year: 2018).\*
"Vector Magic: Convert JPG, PNG images to SVG, EPS, AI vectors", Cedar Lake Ventures, Inc. [retrieved Mar. 10, 2023]. Retrieved from the Internet <https://vectormagic.com/>., 16 Pages.

(Continued)

*Primary Examiner* — Kee M Tung
*Assistant Examiner* — Biao Chen
(74) *Attorney, Agent, or Firm* — FIG. 1 Patents

(57) ABSTRACT

In implementation of techniques for vectorizing by piecewise deconstruction of object strokes, a computing device implements an image processing system to receive an input to initiate the generation of a boundary of an object in a digital image, such as a raster image. The image processing system detects a set of visually separated but semantically related strokes that represent the object's boundary. Based on the set of visually separated but semantically related strokes, the image processing system forms a combined stroke and generates the boundary of the object as a path based on the combined stroke. The resulting path mimics the visual appearance of the object in the digital image in a vector space.

20 Claims, 13 Drawing Sheets
(3 of 13 Drawing Sheet(s) Filed in Color)

(56) References Cited

OTHER PUBLICATIONS

Beri, Tarun, et al., "US Application as Filed", U.S. Appl. No. 17/932,478, filed Sep. 15, 2022, 81 pages.
Bradski, Gary, et al., "The OpenCV Library", Dr. Dobb's, The World of Software Development Blog [retrieved Mar. 16, 2023]. Retrieved from the Internet <https://www.drdobbs.com/open-source/the-opencv-library/184404319>., Nov. 1, 2000, 7 pages.
He, Kaiming, et al., "Mask R-CNN", Cornell University arXiv, arXiv.org [retrieved Mar. 15, 2023]. Retrieved from the Internet <https://arxiv.org/pdf/1703.06870.pdf>., Jan. 24, 2018, 12 pages.
Kirillov, Alexander, et al., "PointRend: Image Segmentation As Rendering", Cornell University arXiv, arXiv.org [retrieved Mar. 10, 2023]. Retrieved from the Internet <https://arxiv.org/pdf/1912.08193.pdf>., Feb. 16, 2020, 10 Pages.
Ronneberger, Olaf, et al., "U-Net: Convolutional Networks for Biomedical Image Segmentation", Cornell University arXiv, arXiv.org [retrieved Mar. 16, 2023]. Retrieved from the Internet <https://arxiv.org/pdf/1505.04597.pdf>., May 18, 2015, 8 pages.

\* cited by examiner

VECTORIZING BY PIECEWISE DECONSTRUCTION OF OBJECT STROKES

BACKGROUND

Various hardware and software systems are configured to reproduce different types of digital images as vector images via vectorization. A vector image is a type of digital image that is made up of paths (e.g., points, lines, curves, and shapes) that relate to one another via mathematical formulas. Vector images have several advantages over other types of digital images, such as scalability, small file sizes, editability, clarity of strokes, and versatility.

However, conventional vectorization techniques result in various issues, such as extraneous paths, computational inefficiencies, visual inaccuracies, and extraneous power consumption. Techniques and systems are needed to make vectorization of digital images more effective and efficient.

SUMMARY

Techniques and systems for vectorizing based on piecewise deconstruction of object strokes are described. In one example, a computing device receives an input to initiate the generation of a boundary of an object in a digital image. Based on the input, the computing device detects a set of strokes that are visually separated and semantically related from a plurality of strokes that represent the boundary of the object in the digital image.

In some examples, the computing device forms a combined stroke based on the set of detected strokes. The computing device generates the boundary of the object as a path based on the combined stroke. Examples of the path include vector curves, cubic Bezier curves, fills, and so forth. Based on the path, the computing device generates a boundary of the object as mimicking a visual appearance of the object in the digital image. The disclosed techniques and systems enable efficient and accurate vectorization of objects in digital images by generating the boundary of the object as the path by combining the visually separated but semantically related strokes that form the object's boundary.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
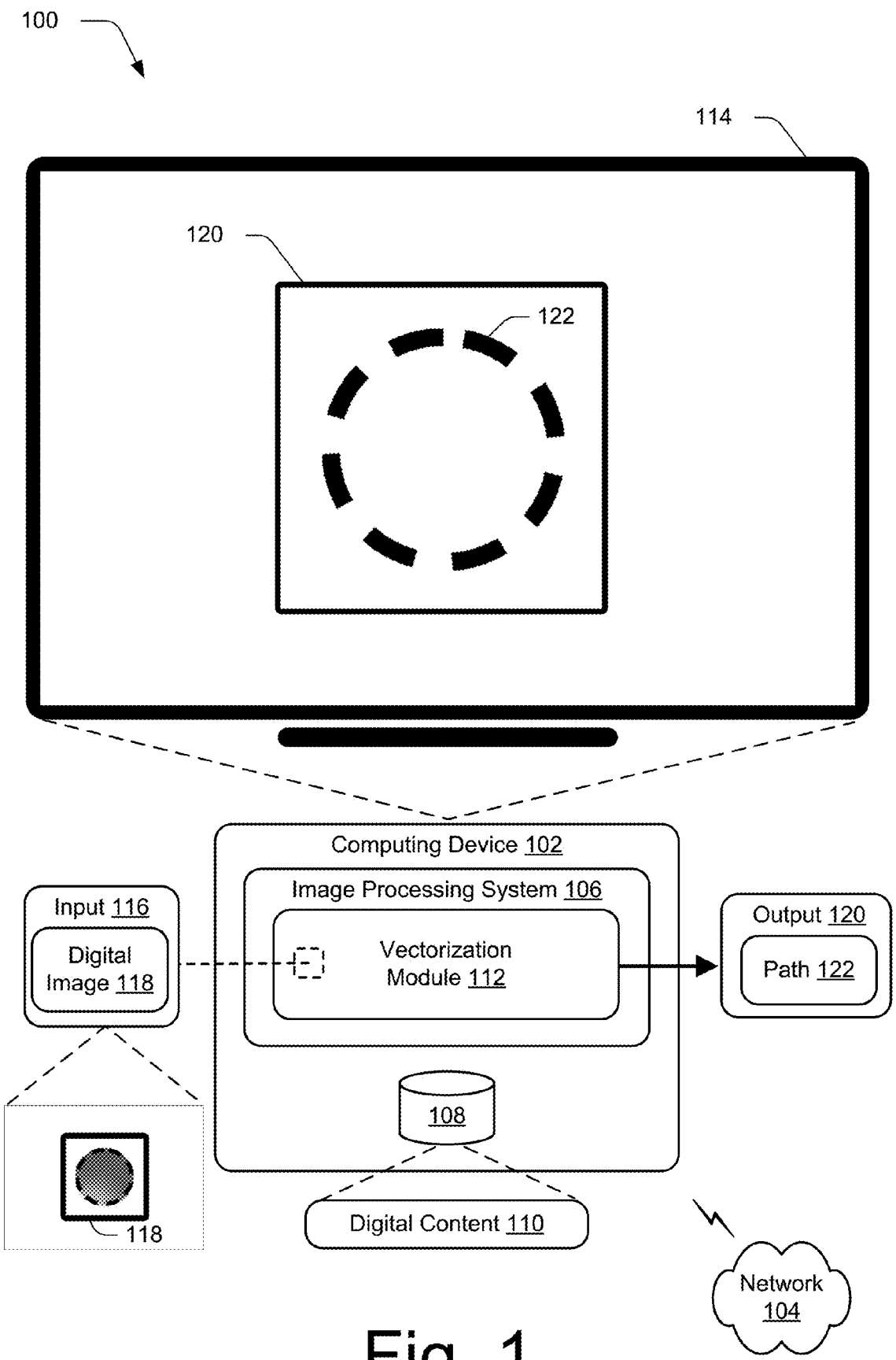
FIG. 1 is an illustration of a digital medium environment in an example implementation that is operable to employ techniques and systems for vectorizing a digital image based on piecewise deconstruction of object strokes, as described herein.

Digital images, such as raster images, are convertible to vector images via vectorization. To reap the advantages of vector images, various hardware and software systems utilize conventional vectorization techniques to vectorize digital images via either manual vectorization by a user or batch vectorization techniques.

Manual vectorization requires a user to meticulously maneuver a cursor to produce a vectorized version of a digital image. For example, to vectorize a raster image of a circle that has an outline of one hundred black dashes, a user meticulously uses a cursor to reproduce the one black hundred dashes as vector strokes in a single path. Accordingly, manual vectorization is a tedious and time-consuming process. Manual vectorization also requires considerable processing power and time to convert a raster image to a vector image.

Another example of conventional vectorization techniques is batch vectorization. Below is a description of the example circle object discussed above, but in a batch vectorization context instead of a manual vectorization context. Initially, the user provides a computing device with the raster image including the circle. Based on the raster image, the computing device generates a vector image including one hundred paths in which each path includes one stroked vector that corresponds to one black dash of the circle's outline. In this way, batch vectorization fails to create paths as a user would create them in a vector space. As described in the example of the circle object in the manual vectorization context, the user creates a single stored path instead of one hundred paths. In summary, conventional batch vectorization techniques produce extraneous paths because conventional batch vectorization techniques fail to detect and integrate non-solid strokes that are semantically related into a single path. The outcome of this failure is an extraneous number of paths that is far from being directly usable.

Batch vectorization results in significant user input to repair the inaccuracies and inefficiencies caused by the batch conversion process. Further, producing extraneous paths based on the raster image causes computing devices to waste unnecessary processing power and memory resources. For instance, batch-based vectorization systems can utilize a large amount of processing resources to convert edges from the raster image into vector strokes that are fractured into extraneous paths, which are then removed and/or corrected based on the significant repairing process described above. Accordingly, conventional vectorization techniques result in computational inefficiencies, visual inaccuracies, and extraneous power consumption.

Techniques and systems for vectorizing a digital image based on piecewise deconstruction of object strokes are described that overcome these limitations. In various examples, a computing device implements an image processing system to receive an input to initiate generation of a boundary of an object in a digital image in a user interface. As an example, a user uploads a raster image of a circle to the image processing system. The circle's outline is a black dashed line, formed by one hundred dashes that are visually separated and semantically related. Upon receiving the input, the image processing system initiates the generation of the boundary of the object in the digital image.

Based on the input raster image, the image processing system detects a set of strokes, which are the one hundred visually separated and semantically related dashes that represent the boundary of the circle. In various examples, the image processing system detects the set of strokes that are visually separated and semantically related via a deep neural network.

Following the detection, the image processing system forms a combined stroke based on the set of dashes. To do this, the image processing system combines the one hundred dashes, effectively reconstructing a single combined stroke of the dashed outline of the circle.

Finally, the image processing system generates the boundary of the object as a path, utilizing the combined stroke. This newly created path accurately represents the original dashed outline of the colored circle in the raster image. In this way, instead of inefficiently and ineffectively generating the boundary of the object as one hundred paths via conventional vectorization techniques, the image processing system efficiently generates the boundary of the object as a single path by vectoring based on piecewise deconstruction of object strokes. Vectorizing based on piecewise deconstruction of object strokes solves the problem of semantically related and visually separated strokes being fractured across different paths, such as across one hundred different paths. Vectorizing based on piecewise deconstruction of object strokes also result in computational efficiencies and effective power consumption as compared to conventional vectorization techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for vectorizing a digital image based on piecewise deconstruction of object strokes.

The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The computing device 102 includes an image processing system 106 configured to process images. By way of example the image processing system 106 may be configured as an application for image processing (e.g., for creating and/or editing digital content), a platform for image processing, a software for image processing, and so forth.

The computing device 102 includes a storage device 108. The storage device 108 is illustrated to include digital content 110, such as digital images, deep neural networks, and so forth. The image processing system 106 includes a vectorization module 112 configured to vectorize (e.g., via generation or rendering) images, such as raster images. In some examples, the vectorization module 112 is configured to convert digital content (e.g., raster images, vector images, or other non-vector formats of digital content) into vector parts (e.g., paths, fills, strokes, shapes, etc.) or vector formats. The vector formats include but are not limited to Scalable Vector Graphics ("SVG"), Adobe Illustrator ("AI"), Encapsulated PostScript ("EPS"), Portable Document Format ("PDF"), Drawing Exchange Format ("DXF"), Windows Metafile ("WMF"), CorelDRAW ("CDR"), and Enhanced Metafile ("EMF").

The computing device 102 includes a user interface 114 configured to display digital content 110 and to receive various input 116, such as a digital image 118 as input 116. Examples of the digital image 118 include vector images, raster images, and so forth. In some examples, the input 116 includes input 116 provided by a user, such as via an input device (e.g., a mouse, a keyboard, a stylus, a microphone, etc.) and the input device communicates the input 116 to the computing device 102, for example, via the network 104. The input 116 describes the user's interactions with the input device. In various examples, the user interacts with the input device and the image processing system 106 to initiate vectorization of the digital image 118. Examples of the initiation of the vectorization include initiation of generation or rendering of a path 122 of the object depicted in the digital image 118.

The image processing system 106 and the vectorization module 112 are configured to receive the input 116. The image processing system 106 and the vectorization module 112 are further configured to provide an output 120 based on the input 116, in which the output includes a path 122. In some examples, the path 122 represents a variety of shapes, such as lines, curves, polygons, or complex shapes with multiple curves and angles. In some examples, the path 122 is assigned a stroke, fill, and other visual attributes to customize its appearance.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Vectorizing by Piecewise Deconstruction of Object Strokes

Figure 2A:
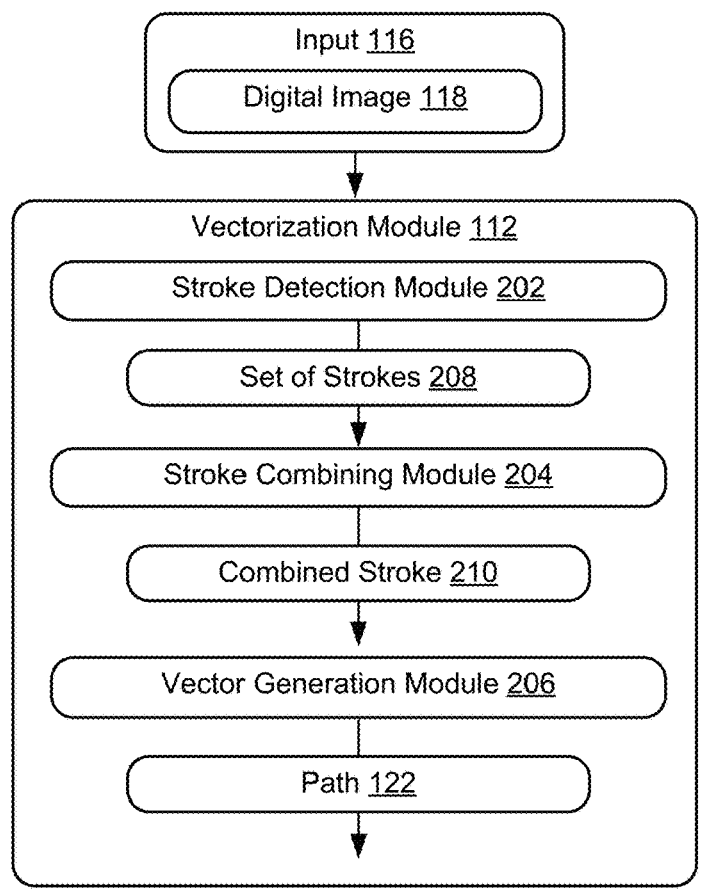
FIG. 2A depicts a system in an example implementation showing operation of a vectorization module for vectorizing a digital image based on piecewise deconstruction of object strokes by generating a boundary of an object as a path based on the piecewise deconstruction of the object strokes.

FIG. 2A depicts a system 200A in an example implementation showing operation of the vectorization module 112 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-11.

In system 200A, the vectorization module 112 includes a stroke detection module 202, a stroke combining module 204, and a vector generation module 206. To begin in this example, the vectorization module 112 is configured to receive an input 116 to initiate vectorization of a digital image 118. In various examples, the input 116 is configured to initiate the generation of a boundary of an object in a digital image 118. The input 116 may be provided by a user or an external system and can include, for example, selecting a specific object within the digital image 118 or providing coordinates to define the object's position in the image. In some examples, the input 116 is a selection of an element displayed via the user interface 114 to initiate the generation.

Based on the input 116, the stroke detection module 202 is configured to detect strokes 208 that are visually separated and semantically related from a plurality of strokes that represent the boundary of the object in the digital image 118. The stroke detection module 202 may employ various techniques, such as edge detection algorithms, pattern recognition, or machine learning techniques, to identify and isolate the set of strokes 208 that are relevant to the object's boundary.

In various examples, the stroke detection module 202 employs a deep neural network to isolate the plurality of strokes that correspond to the object's boundary. The deep neural network is configured to isolate the plurality of strokes that correspond to the object's boundary in various ways, such as by treating raster fill pixels of the digital image 118 as noise and removing the raster fill pixels of the digital image 118, by processing the digital image 118 to output a greyscale version of the digital image 118 including the isolated plurality of strokes, by enabling uninterrupted passage of gradients to decoder layers, by employing a misclassification loss function, and so forth. In some embodiments, the deep neural network is trained on data to determine semantic differences between fills and strokes, to identify semantically related strokes such as dashed strokes, and so forth.

Additionally, or alternatively, the stroke detection module 202 employs one or more deep neural networks to semantically segment the plurality of strokes. In various examples, the one or more deep neural networks detect and combine the set of strokes 208 that correspond to the object's boundary and are visually separate and semantically related. Various examples of the one or more deep neural networks include but are not limited to U-Net based deep neural networks, autoencoders, deep neural networks trained with misclassification loss techniques, and so forth. The one or more deep neural networks are configured to detect the set of strokes 208 that are visually separate and semantically related via various techniques, such as by detecting strokes that are not visually separate (e.g., solid strokes), by misclassification loss techniques, by utilizing skip connections to decoder layers from counterparts in encoder layers, and so forth.

Based on the set of strokes 208, the stroke combining module 204 forms a combined stroke 210. The stroke combining module 204 is configured to utilize various techniques, such as algorithms, machine learning, and so forth to combine the detected set of strokes 208. This can include, for instance, connecting the visually separated strokes based on their proximity, orientation, or other relevant attributes to create the combined stroke 210 that visually represents the object's boundary. In various examples, the stroke combining module 204 employs a deep neural network to generate the combined stroke 210 that visually represents the object's boundary via various techniques, such as by adding pixels to fill gaps between adjacent markings of strokes of the set of strokes 208, by connecting strokes of the set of strokes 208, and so forth.

Based on the combined stroke 210, the vector generation module 206 generates the boundary of the object as a path 122. The vector generation module 206 is configured to convert the combined stroke 210 into a vector format, such as a polyline, a Bézier curve, or a series of line segments, to create the path 122.

By implementing vectorization via piecewise deconstruction of object strokes, the invention enables efficient generation of object boundaries in digital images in which sets of semantically related and visually separate object strokes are represented paths corresponding to the set of semantically related and visually separate object strokes, even in cases where the object's boundary consists of visually separated and semantically related object strokes. This improves the computational efficiency of vectorization techniques in various image processing systems.

Figure 2B:
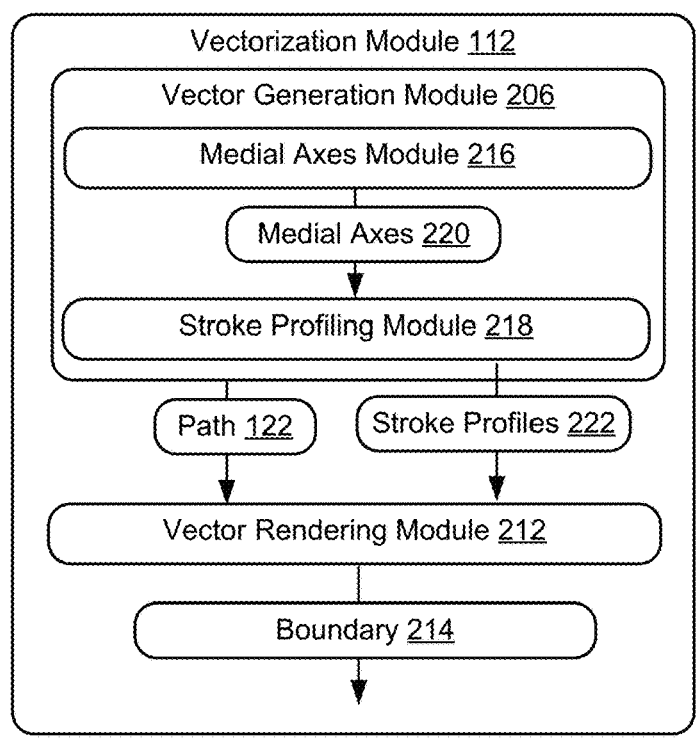
FIG. 2B depicts a system in an example implementation showing operation of a vectorization module for vectorizing a digital image based on piecewise deconstruction of object strokes by rendering a boundary of an object based on the piecewise deconstruction of the object strokes.

FIG. 2B depicts a system 200B in an example implementation showing operation of a vectorization module 112 for vectorizing a digital image 118 based on piecewise deconstruction of object strokes by rendering a boundary 214 of an object based on the piecewise deconstruction of the object strokes.

In system 200B, the vectorization module 112 includes the vector generation module 206 of FIGS. 1 and 2A and a vector rendering module 212, in which the vector rendering module 212 is configured to render vector outputs, such as vector representations of the digital image 118, vector parts such as paths, fills, and vector colors, and so forth. The vector generation module 206 is illustrated as including a medial axes module 216 and a stroke profiling module 218, which facilitate the vector generation of the vector generation module 206.

To begin this example, the vector generation module 206 initiates vector generation (e.g., path generation) by using the digital content 110, such as the set of strokes 208, the combined stroke 210, and so forth. The medial axes module 216, is configured to determine medial axes 220 of the set of strokes 208 that are visually separated and semantically related. The medial axes module 216 is configured to determine the medial axes 220 via various techniques, such as computational geometry techniques, for computing the medial axes 220, which represent the one or more centerlines of the set of strokes 208. In some examples, a medial axis of the medial axes 220 is a reduced or simplified representation of a stroke of the set of strokes 208, such as a skeleton (e.g., in an image space) of the stroke or a polyline (e.g., in a vector space) representing the centerline of the stroke. By way of example, use of polylines results in higher computational efficiency because using polylines as medial axes 220 can reduce a number of points required to represent a combined stroke, thus leading to faster processing and less memory usage.

Based on the medial axes 220, the stroke profiling module 218 generates stroke profiles 222 that describe display characteristics of the set of strokes 208 in relation to the medial axes 220. These display characteristics may include stroke width, stroke dash length, stroke gap length, stroke color, stroke pattern, stroke opacity, stroke caps, stroke joints, and stroke texture, among others.

The stroke width determines the depicted thickness of a stroke of the set of strokes 208. Stroke dash length and stroke gap length control the length of the dashes and gaps in the stroke pattern of the stroke of the set of strokes 208. Stroke color determines the color of the stroke of the set of strokes 208. Stroke pattern refers to the pattern of dashes, dots, or other markings in the stroke of the set of strokes 208. Stroke opacity controls the transparency or opacity of the stroke. Stroke caps and stroke joints determine the shape and style of the ends and joins of the stroke. Stroke texture refers to the texture or surface quality of the stroke, such as being rough or smooth. These characteristics can be used in combination to create a wide range of visual effects and styles.

The stroke profiling module 218 is configured to utilize various techniques, such as image processing, pattern recognition, random sampling, or machine learning, to obtain and analyze the display characteristics of the set of strokes 208. In some embodiments, the stroke profiling module 218 generates stroke profiles 222 by superimposing the combined stroke 210 over the set of strokes 208 and obtaining measurements of the strokes underlying the combined stroke 210. This superimposing technique provides valuable information on the display characteristics of the set of strokes 208, such as their widths, dash lengths, or gap lengths. In some examples, the determined measurements for the stroke profiles are modified to a scale proportionate to the digital image 118 of the input 116, such as the image resolution of the digital image 118 of the input 116.

In the context of stroke widths, the stroke profiling module 218 is configured to generate stroke profiles 222 by obtaining a plurality of width measurements of a stroke of the set of strokes 208 in relation to a medial axis of the medial axes 220, identifying the largest width measurement of the stroke in relation to the medial axis, and generating a corresponding stroke profile with the largest width measurement as the stroke width of the stroke profile 222.

In the context of stroke widths, the stroke profiling module 218 is configured to generate stroke profiles 222, by obtaining a plurality of dash lengths and a plurality of gap lengths of strokes, when applicable, of the set of strokes 208 in relation to a medial axis of the medial axes 220. By way of example, a dash length or a gap length would not be applicable to a solid stroke.

The stroke profiling module 218 is configured to identify a dash length by measuring along the medial axis of corresponding strokes, identifying the largest dash length measurement of the stroke in relation to the medial axis, and generating or modifying a corresponding stroke profile with the largest dash length measurement as the dash length of the stroke profile.

The stroke profiling module 218 is configured to identify a gap length by measuring along the medial axis of corresponding strokes, identifying the largest gap length measurement of the stroke in relation to the medial axis, and generating or modifying a corresponding stroke profile with the largest gap length measurement as the gap length of the stroke profile.

In various embodiments, a vector rendering module 212 renders the boundary 214 of the object based on the path 122 and the stroke profiles 222, mimicking the visual appearance of the object in the digital image 118. This rendering can create a more accurate representation of the object's boundary, which can be useful for editing, extracting, or incorporating the object into other graphics or designs. By implementing this extended method, the invention provides an enhanced solution for generating object boundaries in digital images, taking into account the display characteristics of the visually separated and semantically related strokes, and offering improved accuracy and flexibility in various digital image processing applications.

Based on the path 122 and the stroke profiles 222, the vector rendering module 212 renders the boundary 214 of the object as mimicking the visual appearance of the object in the digital image 118. These rendering techniques result in computationally efficient and accurate representations of the object's boundary in which semantically related and visually separated portions of the boundary are represented in a unified manner in respective paths in a vector space.

Figure 3:
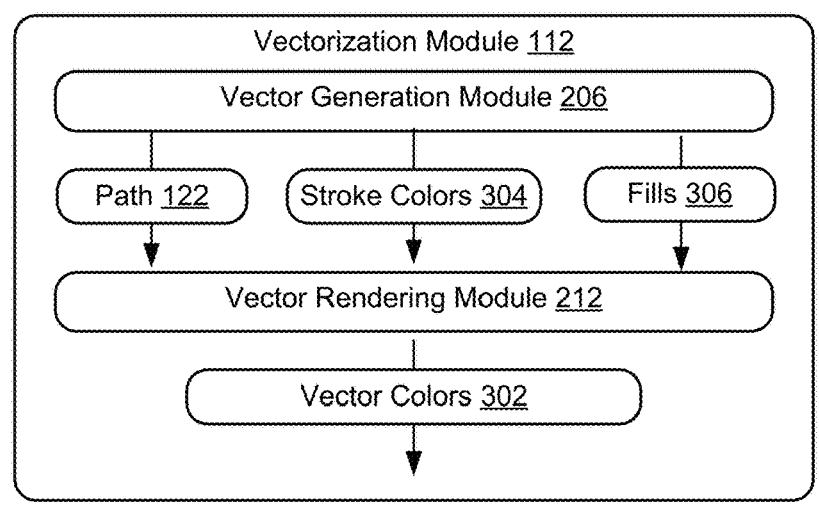
FIG. 3 depicts a system in an example implementation showing operation of a vectorization module for vectorizing a digital image based on piecewise deconstruction of object strokes by generating stroke colors of an object, fills of an object, and a boundary of an object as a path, and rendering vector colors of the object based on the piecewise deconstruction of the object strokes.

FIG. 3 depicts a system 300 in an example implementation showing operation of a vectorization module 112 of FIG. 1 for vectorizing a digital image 118 based on piecewise deconstruction of object strokes by generating stroke colors of an object of a digital image, fills of the object, and a boundary of the object as a path 122, and rendering vector colors of the object based on the piecewise deconstruction of the object strokes.

The vector generation module 206 of illustrated system 300 includes a vector rendering module 212. The vector rendering module 212 processes digital content such as paths 122, stroke colors 304, and fills 306 to render vector content. By way of example, the vector rendering module 212 is configured to receive the path 122 and the stroke profiles 222 to generate the boundary 214 in the example implementation of system 200B described above.

The vector rendering module 212 uses the digital content 110 to output rendered vector content that mimics the visual appearance of the object depicted in the digital image 118. In some examples, the vector rendering module 212 outputs various visual attributes such as vector colors 302 (e.g., stroke colors 304 and colors of fills 306) and/or the boundary 214 of the object. By way of example, the vector rendering module can output the boundary 214 in which the boundary 214 is colored based on the vector colors 302. The vector rendering module 212 ensures that the visual appearance of these outputs is consistent with the original digital image 118, such that the vector colors 302 and the boundary 214 appear as similar as possible to the original colors and edges of the depicted object of the original digital image 118.

To begin this example, the vector generation module 206 determines colors of the digital image 118 that correspond to the object in the digital image 118, as well as the locations of these colors. The vector generation module 206 can utilize various color detection and analysis techniques to identify the relevant colors and their locations within the object. In various embodiments, the vector generation module 206 generates the fills 306 and the stroke colors 304 of the object based on the colors of the digital image 118 that correspond to the object and the locations of these colors. These cross-analysis techniques based on the colors of the digital image 118 that correspond to the object and the locations of these colors can provide a more accurate and visually consistent representation of the object in the digital image 118.

In some examples, the vector generation module 206 determines colors of the digital image 118 that correspond to a stroke of the set of strokes 208 and locations of these colors that correspond to the stroke of the set of strokes 208. This information can be used by the vector generation module 206 to generate appropriate fills 306 and stroke colors 304 for the object's boundary. In various embodiments, the system determines whether the colors of the digital image that correspond to the stroke are the same or not. If the colors are not the same, the generation of the fills 306 can be based at least in part on this information, resulting in more accurate fills by the vector generation module 206 for the object's boundary. By way of example, if the colors are not the same, the vector generation module 206 is configured to convert corresponding content of the path 122 (e.g., a vector curve) to one fill of the fills 306 instead.

In some examples, the vector generation module 206 determines whether the colors of the digital image 118 that correspond to the stroke are the same. If the colors are the same, the vector generation module 206 generates the stroke colors 304 based at least in part on this information, and thus generates accurate stroke colors for the object's boundary.

In one or more embodiments, the vector generation module 206 determines fill styles based on the colors of the digital image 118 that correspond to the object and the locations of these colors. The generation of the fills 306 by the vector generation module 206 can be based on these fill styles, which may include solid color fills, linear gradient fills, radial gradient fills, conical gradient fills, diamond gradient fills, pattern fills, image fills, hatching fills, crosshatching fills, texture fills, unknown fills, or noise fills, among others.

Solid color fills apply a single color to a shape. Linear gradient fills create a gradient of colors that blend smoothly between two or more points in a straight line. Radial gradient fills create a gradient of colors that blends smoothly from the center point of the shape outward. Conical gradient fills create a gradient of colors that blend smoothly around a central point, in a conical shape. Diamond gradient fills create a gradient of colors that blend smoothly between four points arranged in a diamond shape. Pattern fills fill the shape with a repeating pattern or texture. Image fills fill the shape with a specific image or picture. Hatching fills fill the shape with parallel lines that create a pattern or texture. Crosshatching fills fill the shape with intersecting lines that create a pattern or texture. Texture fills fill the shape with a specific texture or surface quality, such as wood grain or metal. Noise fills fill the shape with random variations in color or shading, creating a textured or speckled appearance. Each of these example fill styles, among others, can be used by the vectorization module 112 (e.g., the vector generation module 206 or the vector rendering module 212) to create different visual effects and textures to provide a more accurate representation of the colors of the object depicted in the digital image 118.

Based on the path 122, the stroke colors 304, and the fills 306, the vector rendering module 212 renders vector colors 302 of the object as mimicking the visual appearance of the object in the digital image 118. These rendering techniques result in an accurate representation of the object in the digital image 118, and results in output of the vector colors 302 without the computationally inefficient output of extraneous paths as with the conventional vectorization techniques.

Figure 4:
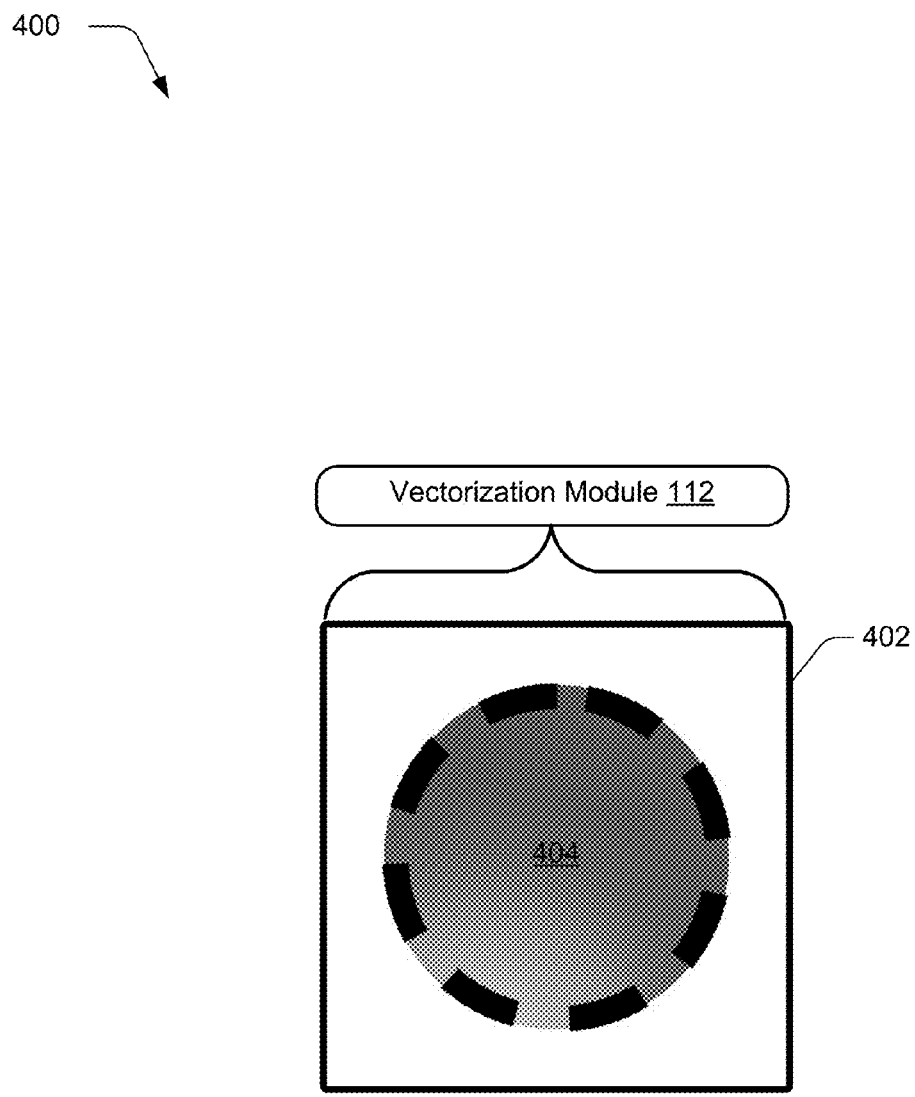
FIG. 4 depicts an example of receiving an input to initiate generation of a boundary of an object in a digital image.

FIGS. 4, 5, 6, 7A, 7B, 8, and 9 illustrate an example of vectorizing by piecewise deconstruction of object strokes. FIG. 4 depicts an example 400 of receiving an input to initiate generation of a boundary of an object in a digital image 402. As illustrated in example 400, the vectorization module 112 receives an input to initiate generation of the boundary of an object 404 in the digital image 402. The digital image 402 includes the object 404 in which the object 404 is a colored circle with a linear gradient fill of purple to pink to orange, in which an outline of the object 404 is a black dashed line of eight visually separate and semantically related black dashes.

Figure 5:
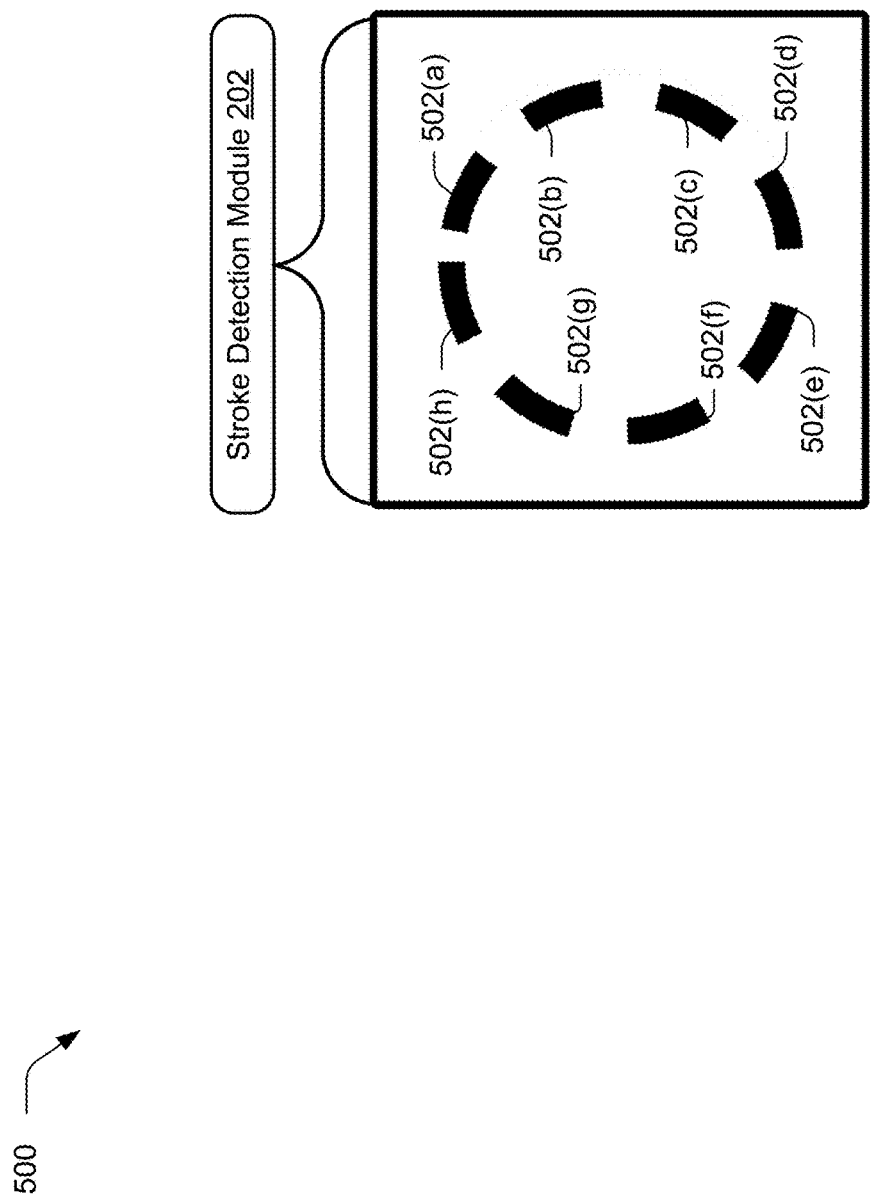
FIG. 5 depicts an example of detecting a set of strokes that are visually separated and semantically related from a plurality of strokes that form a boundary of an object in a digital image.

FIG. 5 depicts an example 500 of detecting a set of strokes that are visually separated and semantically related from a plurality of strokes that form a boundary of the object 404 in the digital image 402. As illustrated in this example 500, the stroke detection module 202 detects a set of strokes 502 in which the set of strokes 502 includes strokes 502(a)-502(h) because the strokes 502(a)-502(h) are detected as being semantically related and visually separated. In some examples, the stroke detection module detects the set of strokes 502 via a deep neural network.

Figure 6:
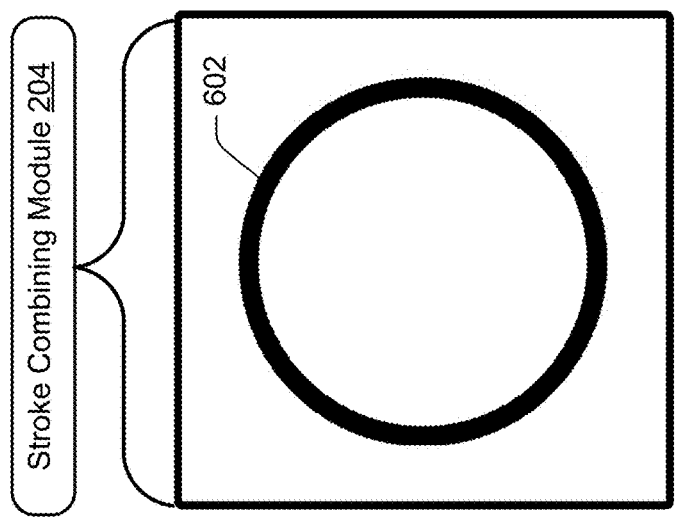
FIG. 6 depicts an example of forming a combined stroke based on a set of strokes that are visually separated and semantically related.

FIG. 6 depicts an example 600 of forming a combined stroke based on a set of strokes that are visually separated and semantically related. As illustrated in this example 600, the stroke combining module 204 combines the strokes 502(a)-502(h) of the set of strokes 502 to generate a combined stroke 602. In various examples, the stroke combining module 204 is configured to generate the combined stroke 602 via a deep neural network. By way of example, the stroke combining module 204 is configured to employ the deep neural network to connect the strokes 502(a)-502(h) of the set of strokes 502 to generate the combined stroke 602.

Figure 7A:
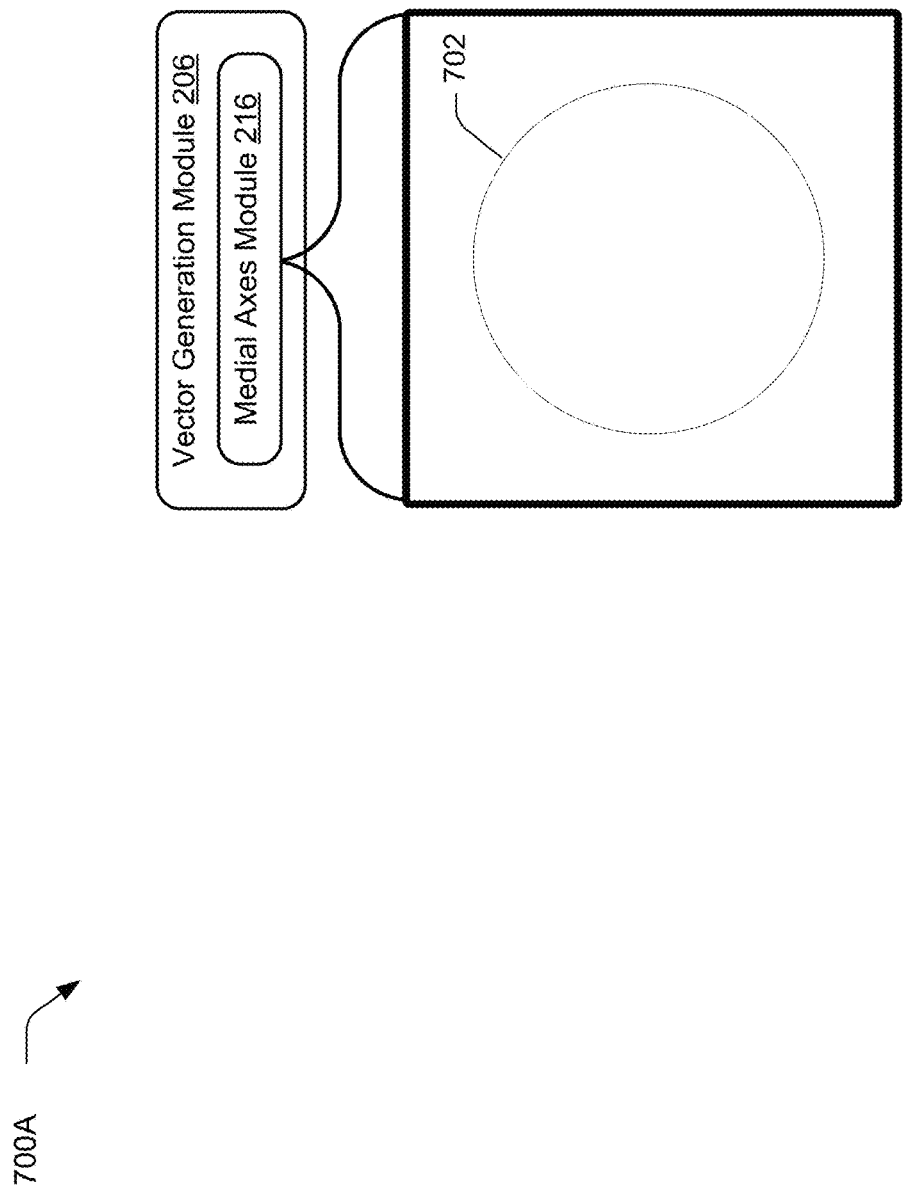
FIG. 7A depicts an example of determining medial axes of a set of strokes that are visually separated and semantically related.

FIG. 7A depicts an example 700A of determining medial axes of a set of strokes that are visually separated and semantically related. As illustrated in this example 700A, the medial axes module 216 of the vector generation module 206 is configured to determine the medial axes 702 of the set of strokes 502. In various examples, the medial axes 702 are determined via a reduction of the combined stroke 602. As depicted in this example 700A, the combined stroke 602 is reduced to the medial axis 702. In some examples, the medial axis 702 (e.g., a reduced representation of the combined stroke 602) is converted to a polyline.

Figure 7B:
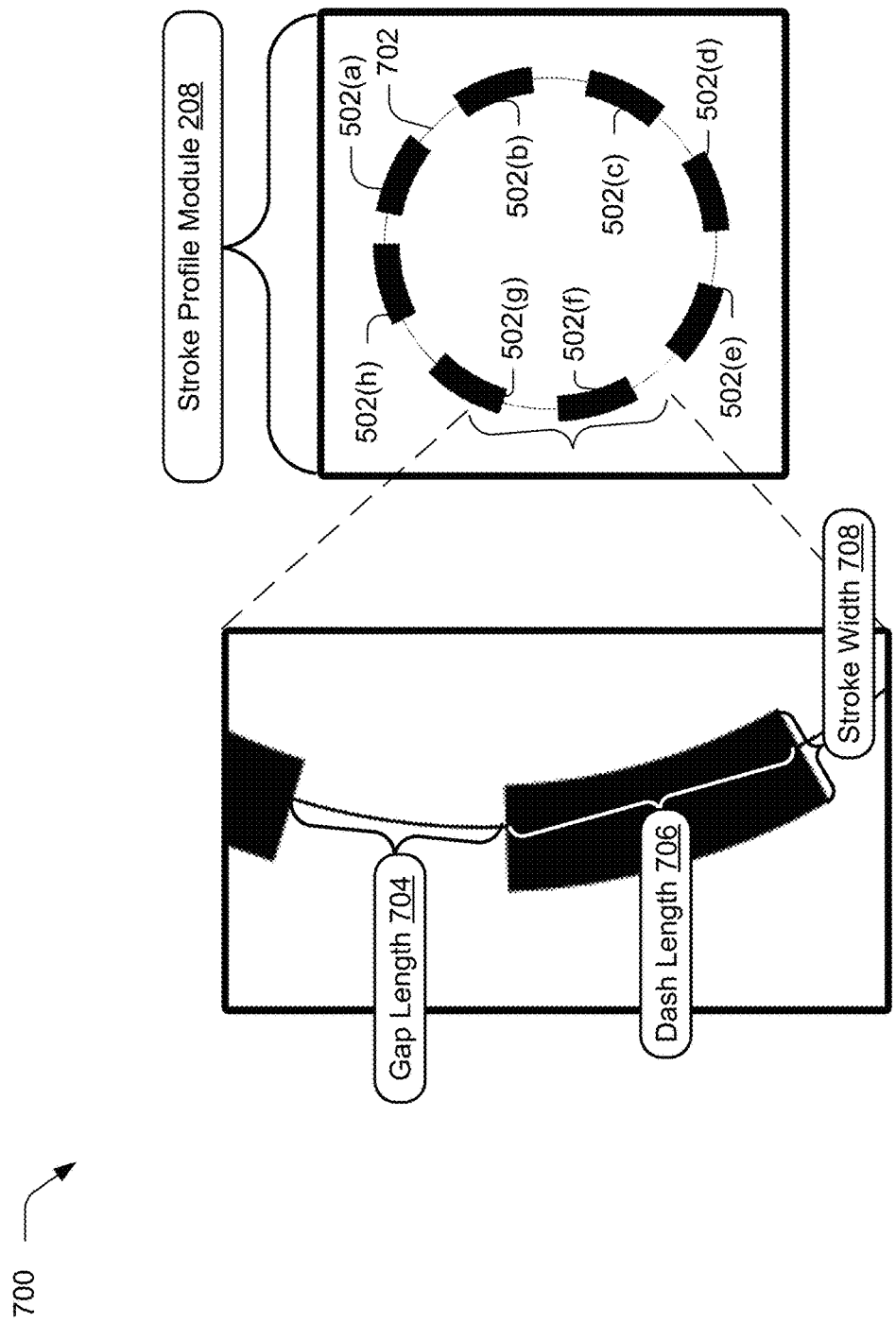
FIG. 7B depicts an example of generating describing display of characteristics of a set of strokes that are visually separated and semantically related in relation to medial axes.

FIG. 7B depicts an example 700B of generating stroke profiles describing display of characteristics of a set of strokes that are visually separated and semantically related in relation to medial axes 702. As illustrated in this example 700B, the stroke profiling module 218 is configured to generate stroke profiles based on strokes 502(a)-502(h) of the set of strokes 502. In various examples, the medial axes 702, such as medial axis 702, are superimposed over the set of strokes 502 to obtain measurements to generate the stroke profiles 222. Display characteristics of the stroke profiles 222 may include gap length 704, dash length 706, or stroke width 708, among other display characteristics. In various examples, the stroke profiling module 218 utilizes sampling techniques to obtain accurate measurements to generate the stroke profiles 222.

Figure 8:
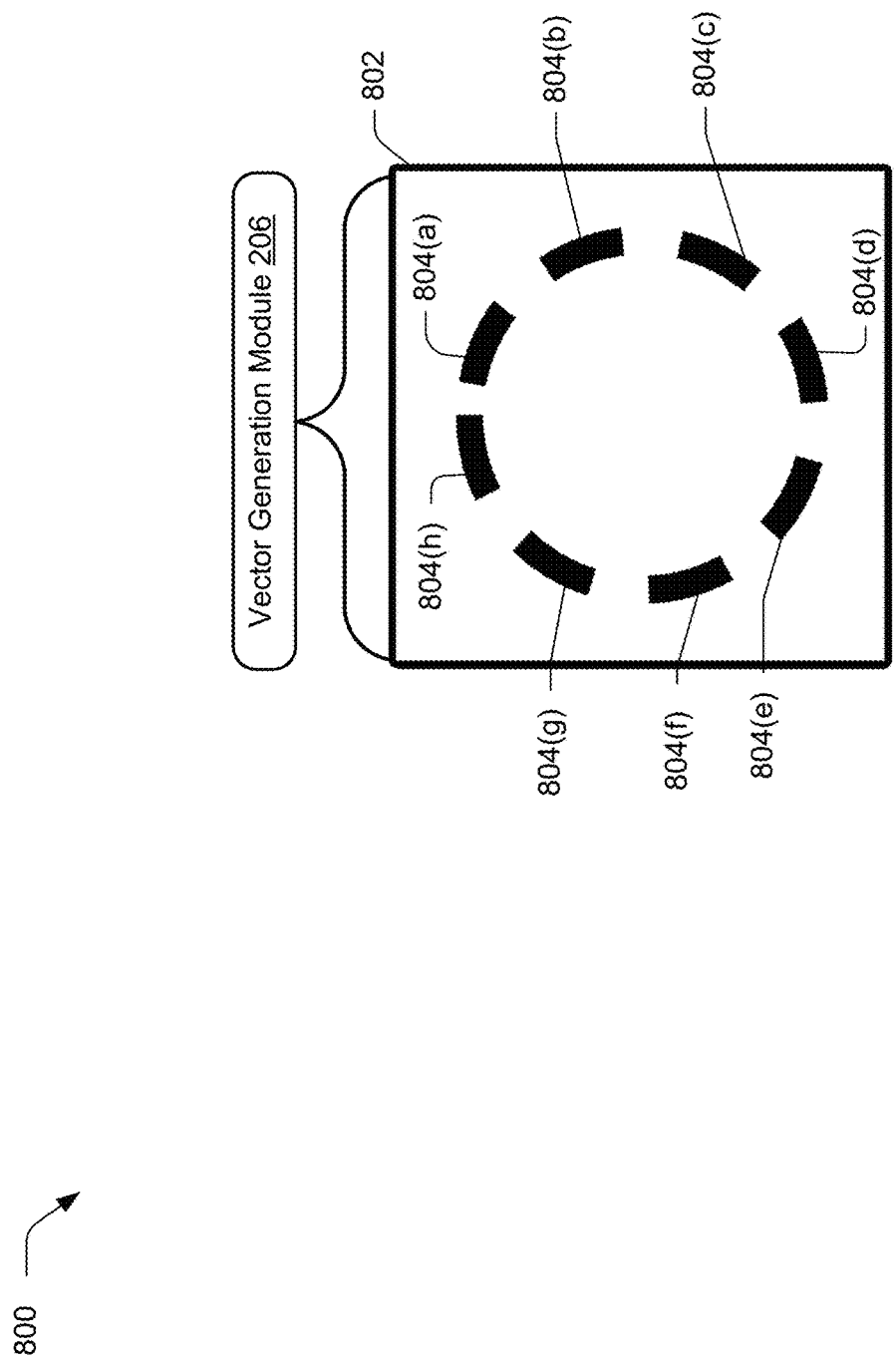
FIG. 8 depicts an example of generating a boundary of an object as a path based on a combined stroke based on a set of strokes that are visually separated and semantically related.

FIG. 8 depicts an example 800 of generating a boundary of an object 404 as a path 804 based on a combined stroke based on a set of strokes that are visually separated and semantically related. As illustrated in this example 800, the vector generation module 206 generates a boundary of the object 404 as a path 804 (including dashes 804(a)-804(h)) as an output 802 based on the combined stroke 602 of FIG. 6 and the set of strokes 502 (including strokes 502(a)-502(h)) that are visually separated and semantically related. In this example 800, the path 804 is illustrated as including vector curves and as being a closed path. In some examples, the path 804 is generated as an open path.

Figure 9:
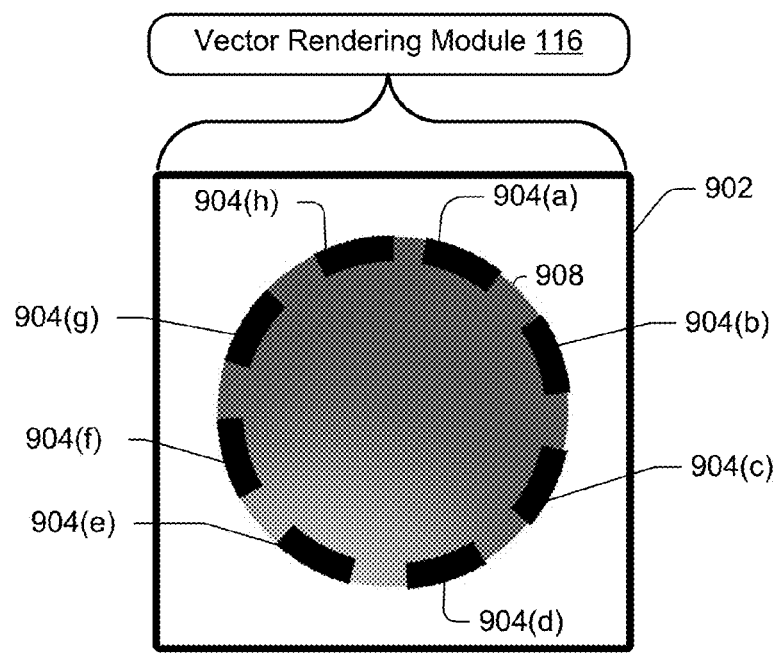
FIG. 9 depicts an example of rendering a boundary of an object and vector colors of the object as mimicking a visual appearance of the object based on piecewise deconstruction of object strokes of the object.

FIG. 9 depicts an example 900 of rendering a boundary 904 of an object 404 and vector colors of the object 404 as mimicking a visual appearance of the object 404 based on piecewise deconstruction of object strokes of the object 404. As illustrated in this example 900, the vector rendering module 212 renders the boundary 904 (including dashes 904(a)-904(h)) of the object 404 and in addition to vector colors (e.g., the vector fill of the shape 908 with a gradient fill style and the black stroke colors of the boundary 904) as an output 902, based on the piecewise deconstruction of the object strokes of the object 404 depicted in the digital image 402.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of the procedure are implementable in hardware, firmware, software, or a combination thereof. The procedure is shown as a set of blocks that specify operations performed by one or more devices and are not necessarily limited to the orders shown for performing the operations by the respective blocks. In portions of the following discussion, reference is made to FIGS. 1-9.

Figure 10:
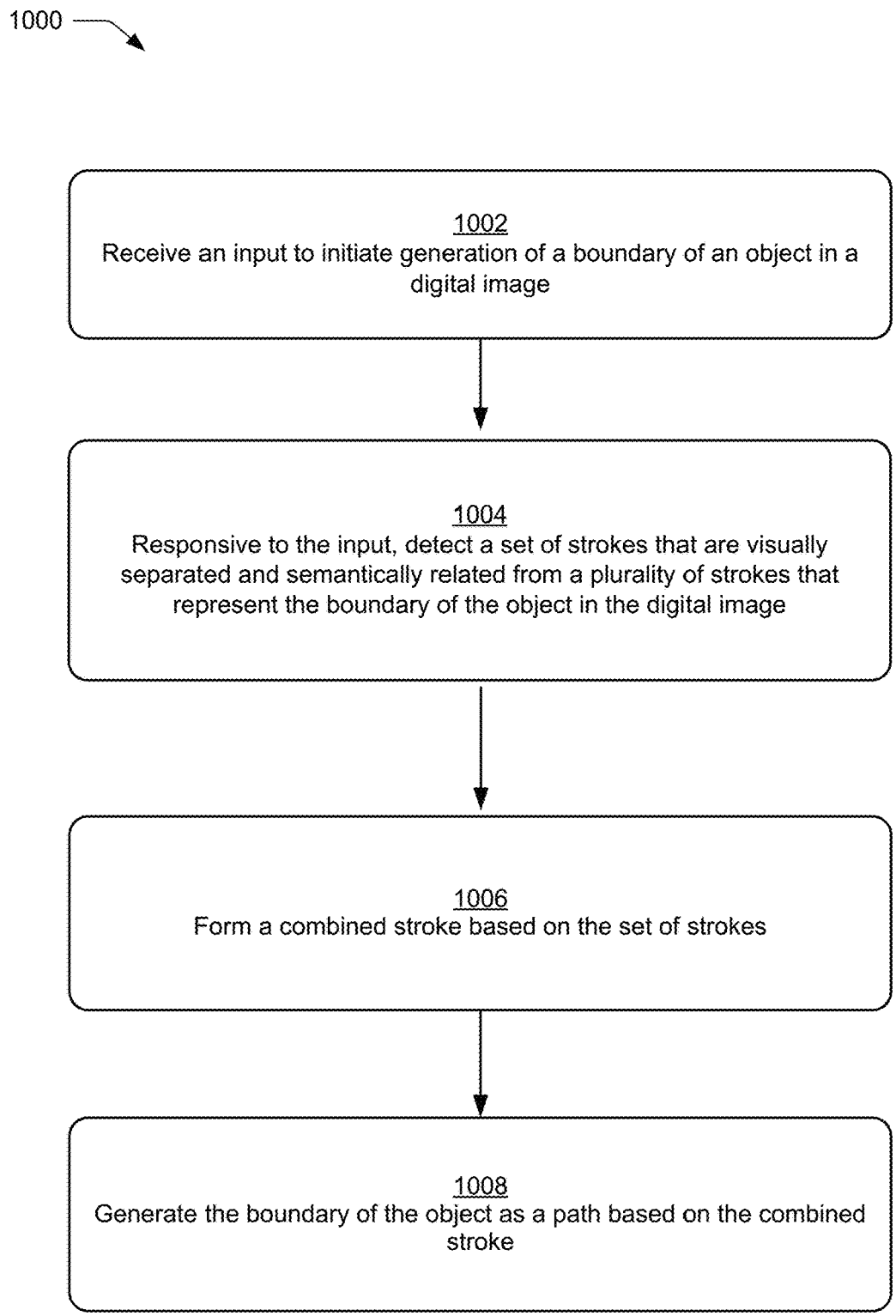
FIG. 10 depicts a procedure in an example implementation of vectorizing a digital image based on piecewise deconstruction of object strokes.

FIG. 10 depicts a procedure 1000 in an example implementation of vectoring by piecewise deconstruction of object strokes. An input to initiate generation of a boundary of an object in a digital image is received (block 1002). For instance, in some examples, the vectorization module 112 of an image processing system 106 receives a digital image, such as a raster image, to initiate the generation. Responsive to the input, a set of strokes that are visually separated and semantically related from a plurality of strokes that represent the boundary of the object in the digital image are detected (block 1004). For example, a deep neural network of the stroke detection module 202 is employable to detect a set of strokes 208 that are visually separated and semantically related, such as a set of dashed strokes forming a shape. A combined stroke is formed based on the set of strokes (block 1006). For example, the stroke combining module 204 of the vectorization module 112 generates a combined stroke 210 based on the set of strokes 208 received from the stroke detection module 202. The boundary of the object as a path is generated based on the combined stroke (block 1008). By way of example, the vector generation module 206 of the vectorization module 112 generates a path 122 based at least in part on the combined stroke 210 received from the stroke combining module 204. In some embodiments, the path 122 includes vector curves, such as Bezier curves.

Example System and Device

Figure 11:
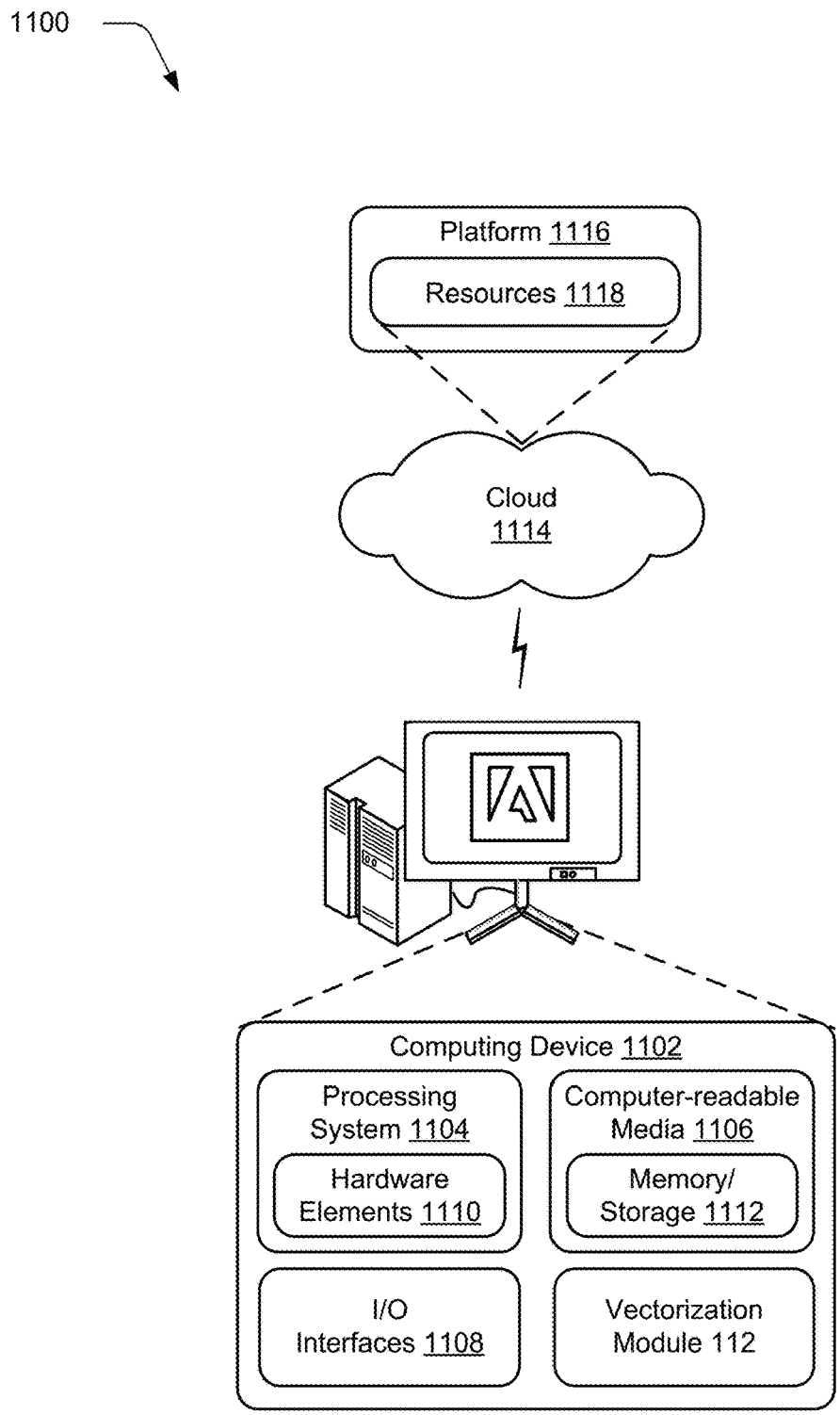
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the vectorization module 112. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices and/or processing systems 1104) to implement techniques, modules, and examples described herein.

The techniques described herein are supported by various configurations of the computing device 1102 and are not limited to the specific examples of the techniques described herein. This functionality is also implementable through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

What is claimed is:

1. A method comprising:
    receiving, by a processing device, an input to initiate generation of a boundary of an object in a digital image;
    responsive to the input, detecting, by the processing device, a set of strokes that are visually separated and semantically related from a plurality of strokes that represent the boundary of the object in the digital image;
    forming, by the processing device, a combined stroke based on the set of strokes;
    determining, by the processing device, medial axes of the set of strokes;
    generating, by the processing device, stroke profiles describing display characteristics of the set of strokes in relation to the medial axes;
    generating, by the processing device, the boundary of the object as a path based on the combined stroke; and
    rendering, by the processing device, the boundary of the object based on the path and the stroke profiles as mimicking a visual appearance of the object in the digital image.

2. The method of claim 1, further comprising generating, by the processing device, the plurality of strokes that represent the boundary of the object in the digital image.

3. The method of claim 2, wherein the generating of the plurality of strokes that represent the boundary of the object in the digital image is via a deep neural network.

4. The method of claim 1, wherein the forming of the combined stroke further comprises connecting strokes of the set of strokes that are visually separated and semantically related.

5. The method of claim 4, wherein the connecting of the strokes of the set of strokes that are visually separated and semantically related includes adding pixels to fill gaps between adjacent markings of the strokes that are visually separated and semantically related.

6. The method of claim 1, wherein the detecting of the set of strokes and the forming of the combined stroke is via a deep neural network.

7. The method of claim 1 wherein:
    the determining of the medial axes further comprises reducing the combined stroke to the medial axes; and
    the generating of the stroke profiles further comprises superimposing the combined stroke over the set of strokes and obtaining measurements of the strokes of the set of strokes underlying the combined stroke.

8. The method of claim 1 wherein the generating of the stroke profiles further comprises:
    obtaining a plurality of width measurements of a stroke of the set of strokes in relation to a medial axis of the medial axes;
    identifying a largest width measurement of the stroke of the set of strokes in relation to the medial axis; and
    generating a stroke profile corresponding to the stroke of the set of strokes in which the largest width measurement is a stroke width of the stroke profile.

9. The method of claim 1 wherein the display characteristics include at least one of a stroke width, stroke dash length, or a stroke gap length.

10. The method of claim 1, further comprising:
    determining, by the processing device, colors of the digital image that correspond to the object in the digital image and locations of the colors of the digital image that correspond to the object in the digital image; and
    generating, by the processing device, fills and stroke colors of the object based on the colors of the digital image that correspond to the object in the digital image and the locations of the colors of the digital image that correspond to the object in the digital image.

11. The method of claim 10, wherein the determining of the colors and the locations of the colors further comprises determining, by the processing device, colors of the digital image that correspond to a stroke of the set of strokes and locations of the colors of the digital image that correspond to the stroke of the set of strokes.

12. A system comprising:
    a memory component; and
    a processing device coupled to the memory component, the processing device to perform operations comprising:
        receiving an input to initiate generation of a boundary of an object in a digital image;
        responsive to the input, detecting a set of strokes that are visually separated and semantically related from a plurality of strokes that form the boundary of the object in the digital image;
        forming a combined stroke based on the set of strokes;
        determining medial axes of the set of strokes that are visually separated and semantically related;
        generating stroke profiles describing display characteristics of the set of strokes in relation to the medial axes;
        generating the boundary of the object as a path based on the combined stroke; and
        rendering the boundary of the object based on the path and the stroke profiles as mimicking a visual appearance of the object in the digital image.

13. The system of claim 12, further comprising:
    determining colors of the digital image that correspond to the object in the digital image and locations of the colors of the digital image that correspond to the object in the digital image; and
    generating fills and stroke colors of the object based on the colors of the digital image that correspond to the object in the digital image and the locations of the colors of the digital image that correspond to the object in the digital image.

14. The system of claim 13, wherein the determining of the colors and the locations of the colors further comprises determining colors of the digital image that correspond to a stroke of the set of strokes and locations of the colors of the digital image that correspond to the stroke of the set of strokes.

15. The system of claim 14, further comprising determining the colors of the digital image that correspond to the stroke are not same, and wherein the generating of the fills is based at least in part on the colors of the digital image that correspond to the stroke are not the same.

16. The system of claim 14, further comprising determining the colors of the digital image that correspond to the stroke are same colors, and wherein the generating of the stroke colors is based at least in part on the colors of the digital image that correspond to the stroke are the same colors.

17. The system of claim 14, further comprising determining fill styles based on the colors of the digital image that correspond to the object in the digital image and the locations of the colors of the digital image that correspond to the object in the digital image, and wherein the generating of the fills is based on the fill styles.

18. The system of claim 17, wherein the fill styles include at least one of a solid color fill, a linear gradient fill, a radial gradient fill, a conical gradient fill, a diamond gradient fill, a pattern fill, an image fill, a hatching fill, a crosshatching fill, a texture fill, or a noise fill.

19. The system of claim 13, further comprising:
based on the path, the stroke colors, and the fills, rendering vector colors of the object as mimicking a visual appearance of the object in the digital image.

20. A non-transitory computer-readable storage medium storing executable instructions, which when executed by a processing device, cause the processing device to perform operations comprising:
receiving an input to initiate generation of a boundary of an object in a digital image;
responsive to the input, detecting a set of strokes that are visually separated and semantically related from a plurality of strokes that form the boundary of the object in the digital image;
determining medial axes of the set of strokes that are visually separated and semantically related;
generating stroke profiles describing display characteristics of the set of strokes in relation to the medial axes;
forming a combined stroke based on the set of strokes;
generating the boundary of the object as a path based on the combined stroke; and
rendering the boundary of the object based on the path and the stroke profiles as mimicking a visual appearance of the object in the digital image.

* * * * *